US006114820A

United States Patent [19]

Nishigaya

[11] Patent Number: 6,114,820

[45] Date of Patent: Sep. 5, 2000

[54] POWER WINDOW APPARATUS HAVING SAFETY UNIT

[75] Inventor: Masanori Nishigaya, Shizuoka, Japan

[73] Assignee: Koito Manufacturing Co., Ltd., Tokyo, Japan

[21] Appl. No.: 09/267,638

[22] Filed: Mar. 15, 1999

[30] Foreign Application Priority Data

Mar. 13, 1998 [JP] Japan .................................. 10-062756

[51] Int. Cl.$^{7}$ ........................................................ G05B 5/00

[52] U.S. Cl. .......................... 318/466; 318/466; 318/468; 318/469; 318/256; 318/264; 318/265; 318/266; 318/268; 318/272; 318/273; 318/275; 318/282; 318/434; 318/630; 318/650; 318/652; 318/653; 318/663; 49/26; 49/28; 49/31; 49/348; 49/349; 49/350; 160/292; 160/293.1; 33/1 PT; 33/706; 33/708

[58] Field of Search ..................................... 318/466, 468, 318/469, 256, 264, 265, 266, 268, 272, 273, 275, 282, 434, 630, 652, 653, 650, 663, 665, 666, 670; 49/26, 28, 31, 348, 349, 350, 352; 160/292, 293.1; 33/1 PT, 706, 708

[56] References Cited

U.S. PATENT DOCUMENTS

| | | | |
|---|---|---|---|
| 4,338,747 | 7/1982 | Hess et al. | 49/349 |
| 5,222,327 | 6/1993 | Fellows et al. | 49/139 |
| 5,351,439 | 10/1994 | Takeda et al. | 49/28 |
| 5,404,673 | 4/1995 | Takeda et al. | 318/28 |
| 5,422,551 | 6/1995 | Takeda et al. | 318/265 |
| 5,459,379 | 10/1995 | Takeda et al. | 49/469 |
| 5,773,947 | 6/1998 | Torii et al. | 318/466 |
| 5,832,664 | 11/1998 | Tajima et al. | 49/26 |

*Primary Examiner*—Robert E. Nappi
*Assistant Examiner*—Edgardo San Martin
*Attorney, Agent, or Firm*—Sughrue, Mion, Zinn, Macpeak & Seas, PLLC

[57] ABSTRACT

A power window apparatus is provided for detecting pinching in accordance with the opened/closed position of the window and a state of rotation of a motor, the apparatus having a position sensor which detects a safety-control suspension region of the window and which is an accurate sensor. A spiral guide groove is formed in the inner surface of a housing opposite to a rotational plate which is rotated by an output shaft of a motor which opens/closes a window. A follower which is guided by the spiral guide groove is able to move along a straight guide groove provided for the rotational plate in the radial direction. Terminals in the form of conductive films are provided for a printed circuit board accommodated in the housing. When the rotational plate has been rotated, the follower is guided by the spiral guide groove so as to be moved in the straight guide groove. Thus, a slide member provided for the follower is brought into contact with the terminals so that the terminals are conducted with each other. Thus, an electric signal is output from the terminals. A safety-control suspension region can be detected with an accuracy of one-to-one correspondence to the amount of movement of the window. Moreover, a necessity of disposing the position sensor adjacent to the window can be eliminated.

5 Claims, 7 Drawing Sheets

PRIOR ART

POWER WINDOW APPARATUS HAVING SAFETY UNIT

BACKGROUND OF THE INVENTION

1. Technical Field of the Invention

The present invention relates to a power window apparatus having a safety unit, which causes a window provided for a vehicle, such as an automobile, to be opened/closed by a motor, or the like, and performs a safety control operation for preventing pinching of the hand or the head by the window. In particular, this invention is directed to a power window apparatus having a structure with a position sensor for detecting the position of the window integrally provided with the motor.

2. Description of the Prior Art

In general, a power window apparatus incorporates a drive source, such as a motor, which causes the window to perform an opening/closing operation. With such power window apparatuses, accidents occur where a hand or a head of a person is pinched between the window glass and the sash. Therefore, an apparatus incorporating a safety unit has been suggested which interrupts the operation for closing the window or causes the window to perform an opening operation when the foregoing accident of pinching has been detected.

A power window apparatus of the foregoing type has been adapted to include a method of detecting pinching of a hand or head, or the like, by measuring the opening/closing speed of the window or the rotational speed of the motor having the correlation with the opening/closing speed. If the speed is reduced to a level lower than a reference value, that is, if loads imposed on the window and the motor are enlarged and thus the rotational speed is reduced due to a pinching action, the occurrence of the pinching is detected.

The above-mentioned detecting method, however, encounters an error in detection of pinching when movement speed of the window or rotational speed of the motor has been reduced because of contact of the window glass with a weather strip provided for the sash. As a result, the operation for closing the window is undesirably interrupted and, thus, the window cannot completely be closed. In a window incorporating a weather strip WS which has a cross sectional shape as shown in FIG. 7, and which is joined to a sash SS, the upper end of a window glass 7 starts making contact with the weather strip WS at a position about 4 mm before the fully closed position of the window. Therefore, an error in detection occurs in the region in which the foregoing contact is made. Since the above-mentioned gap of about 4 mm only allows pinching of the leading end of the finger to occur, the chances of any critical safety problems do not arise in this above-mentioned gap. Therefore, the region of 4 mm is made to be a safety-control suspension region which is not safety-controlled. In other words, the safety-control mechanism is not activated in this gap.

To recognize the safety-control suspension region, a technique has been suggested by which the position of the window is detected in accordance with an amount of rotation of the motor. However, a means for detecting an amount of rotation of the motor has a complicated structure which causes the cost to be raised. The power window apparatus has a structure that the rotational force of the motor is transmitted to the window glass through a gear mechanism, a wire and pulley mechanism and so forth. Twist occurring in the direction of rotation considered to be caused from a damper provided for the gear mechanism, elongation of the wire and abrasion of the pulley cause deviation to occur between the rotational speed of the motor and the opened/closed position of the window. As a result, recognition of the safety control region by accurately detecting the opened/closed position of the window, that is, accurate recognition of the safety-control suspension region, cannot easily be performed.

Therefore, the inventor of the present invention has suggested a power window apparatus having a structure incorporating a means for mechanically and electrically detecting the opened/closed position of the window which overcomes the above-identified problems. In such a power window apparatus, the safety-control suspension region is recognized in accordance with the detected opened/closed position of the window. As a means for mechanically and electrically detecting the opened/closed position of the window, a position sensor having a structure of a potentiometer is disposed adjacent to the closed position of the window. An output of the position sensor is used to recognize the safety-control suspension region.

However, the above-mentioned apparatus requires a space for the position sensor to be disposed adjacent to the closed position of the window. Therefore, simplification of the structure and economy of space in the vicinity of the window of an automobile cannot satisfactorily be realized. Since an error in the positioning of the sensor causes an error in detection of the opened/closed position of the window to occur, the position at which the position sensor is mounted must accurately be controlled. As a result, there arises a problem in that an operation for mounting the power window apparatus on the automobile cannot easily be completed. Another problem arises in that the accuracy to detect the position cannot easily be improved.

SUMMARY OF THE INVENTION

An object of the present invention is to provide a power window apparatus having a safety unit which employs a structure in which the motor detects the opened/closed position of the window without the necessity of individually disposing a sensor adjacent to the closed position of the window so as to solve the problem of requiring additional installation space while ensuring accurate detection of the safety-control suspension region.

A power window apparatus having a safety unit according to the present invention comprises a position sensor for detecting an opened/closed position of a window which is opened/closed by a motor to perform a pinch preventive safety control operation in accordance with the detected opened/closed position. The position sensor incorporates a spiral guide fixedly disposed in a housing integrally supported by the motor; a rotational plate arranged to be rotated along a guide surface of the spiral guide by an output shaft of the motor disposed at the center of the spiral guide and provided with a straight guide groove formed in a radial direction; a terminal disposed at a predetermined position in the housing opposite to a predetermined region of the spiral guide; and a follower supported in the straight guide groove of the rotational plate arranged to be moved along the straight guide groove while the follower is being guided by the spiral guide and brought into contact with the terminal at a predetermined movement position to enable an electric signal to be output from the terminal.

The position sensor according to the present invention is provided with a gear arranged to be rotated by the output shaft of the motor, a magnet disposed in at least a portion of the circumference of the gear and a hall element disposed adjacent to the gear and arranged to detect a state of rotation of the magnet caused by the rotation of the gear, and the opened/closed position of the window or pinching is detected in response to a pulse signal output from the hall element.

According to the present invention, when the rotational plate has been rotated by the motor, the follower supported by the rotational plate is moved in a radial direction along the straight guide groove formed in the rotational plate in the radial direction while the follower is being guided by the spiral guide groove. When the follower has been moved from the inner position to the outer position in accordance with an amount of rotation of the motor, a slide member provided for the follower is brought into slidable contact with the terminal provided for the terminal. Thus, the terminal is brought to a conducted state so that an electric signal is output. As a result, the predetermined rotational position of the motor, that is, the safety-control suspension region of the window in the power window apparatus, can be detected.

DETAILED DESCRIPTION OF THE INVENTION

Figure 1:
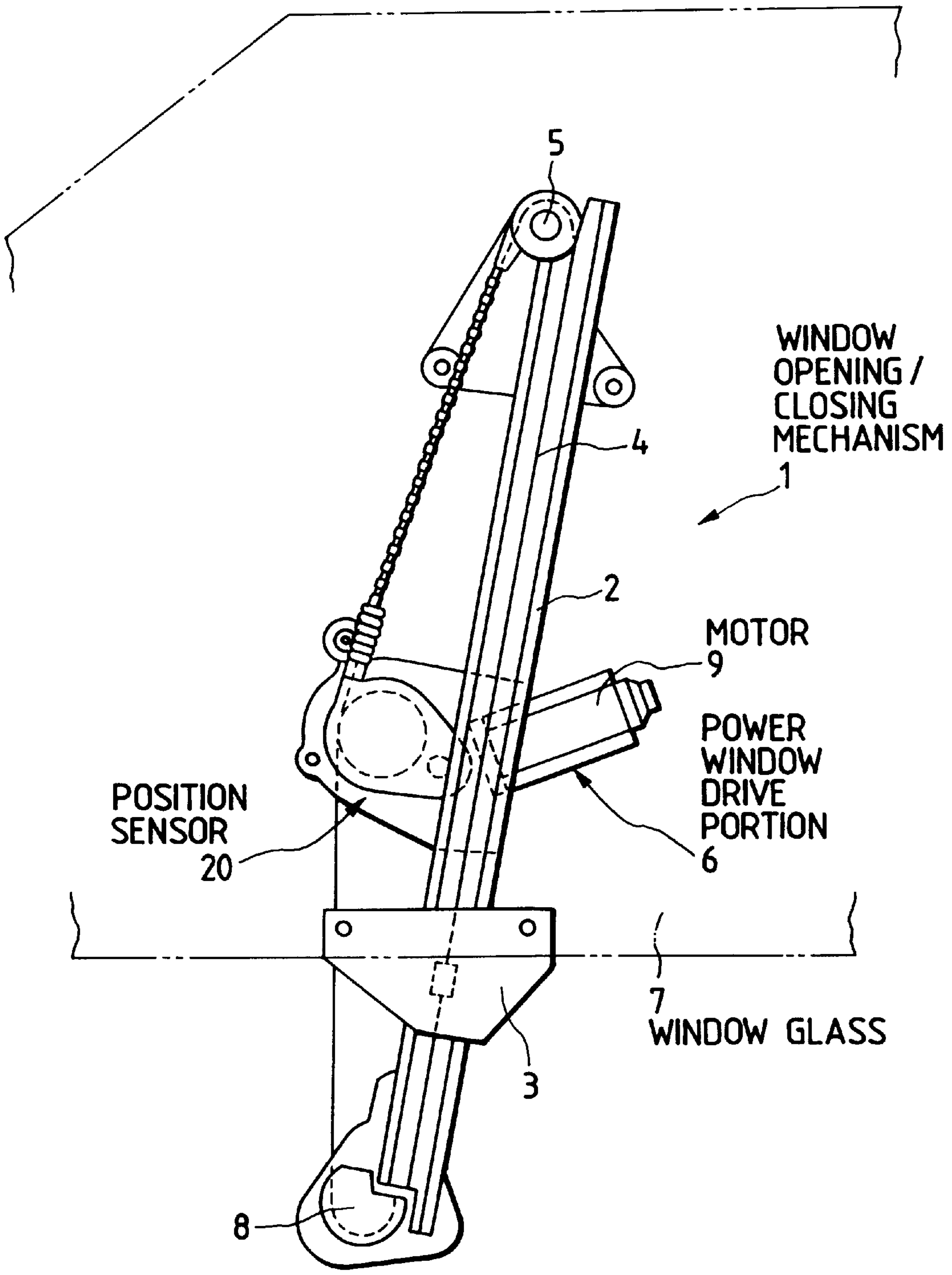
FIG. 1 is a side view showing the overall structure of a power window apparatus according to the present invention.

An embodiment of the present invention will now be described with reference to the drawings. FIG. 1 is an overall structural view showing a power window apparatus to which the present invention is applied. FIG. 1 shows the window is an open position. A window opening/closing mechanism 1 is disposed in a portion of a car body below the window of an automobile. The window opening/closing mechanism 1 has a rail 2 extending vertically. The rail 2 holds a slider 3 slidably in the vertical direction. A wire 4 is connected to the slider 3. The wire 4 is arranged between pulleys 5 and 8 disposed at upper and lower ends of the rail 2. Moreover, the wire 4 runs along a pulley 16 (described later) provided for a power-window moving portion 6 secured and supported at a substantially intermediate position of the rail 2. As described later, the power-window moving portion 6 is provided with a motor 9 for rotating the pulley 16. When the motor 9 has been rotated, the wire 4 is rotated so that the slider 3 is moved vertically. A window glass 7 is joined to the slider 3 so as to be moved vertically together with the slider 3 so that a window space formed by a sash is opened/closed.

Figure 2:
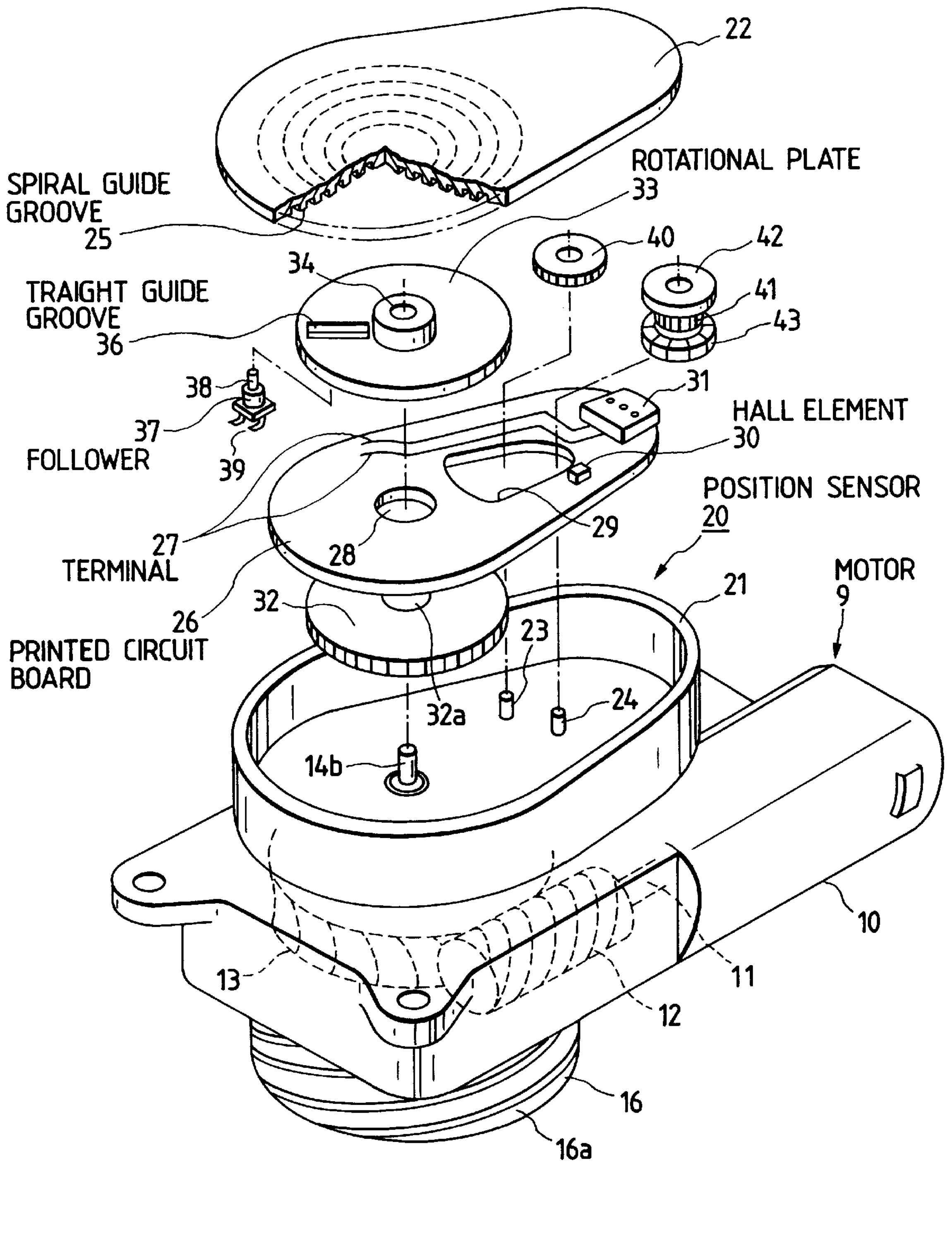
FIG. 2 is a partially-exploded perspective view showing a position sensor according to the present invention.
Figure 3:
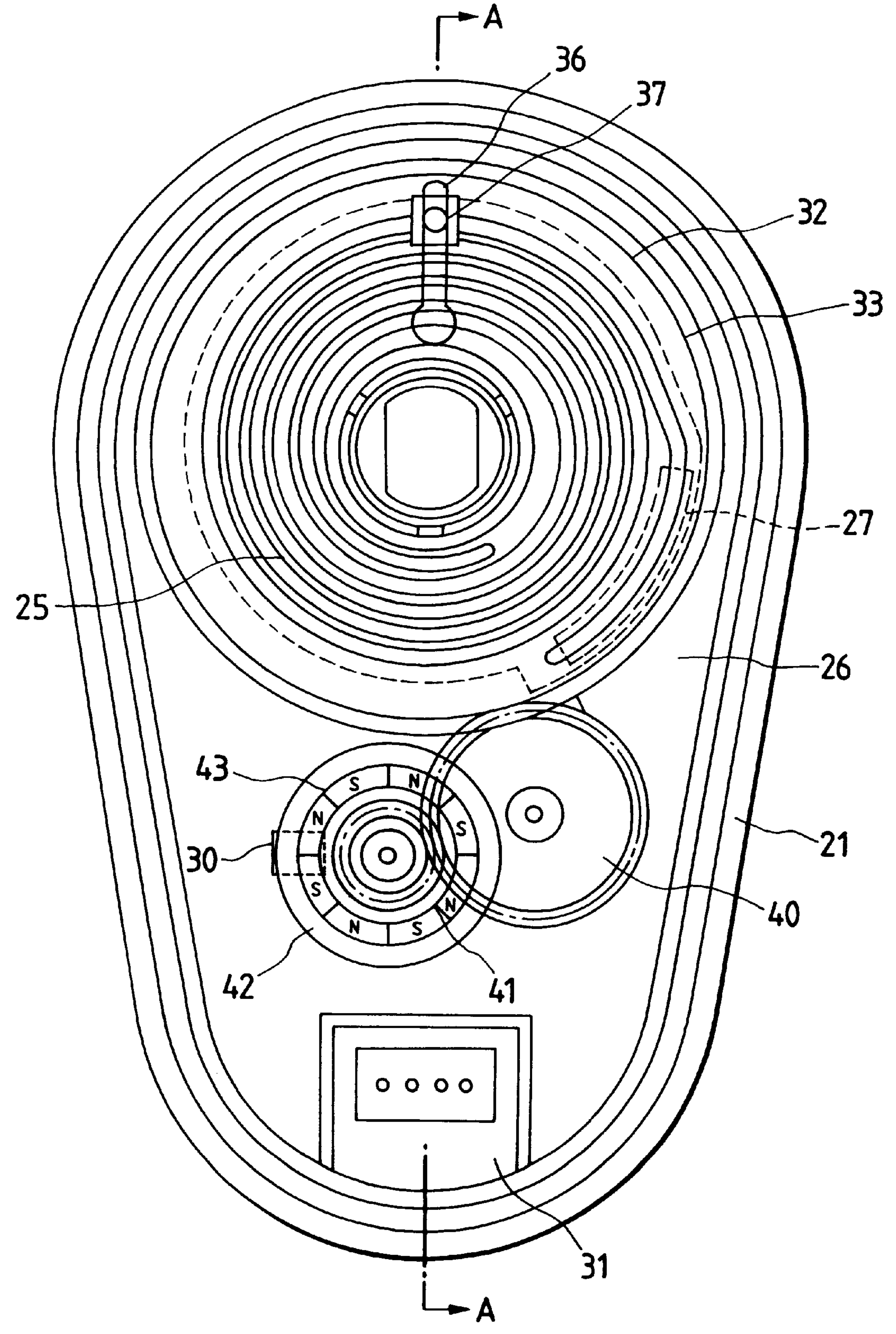
FIG. 3 is a plan layout view showing the position sensor shown in FIG. 2.
Figure 4:
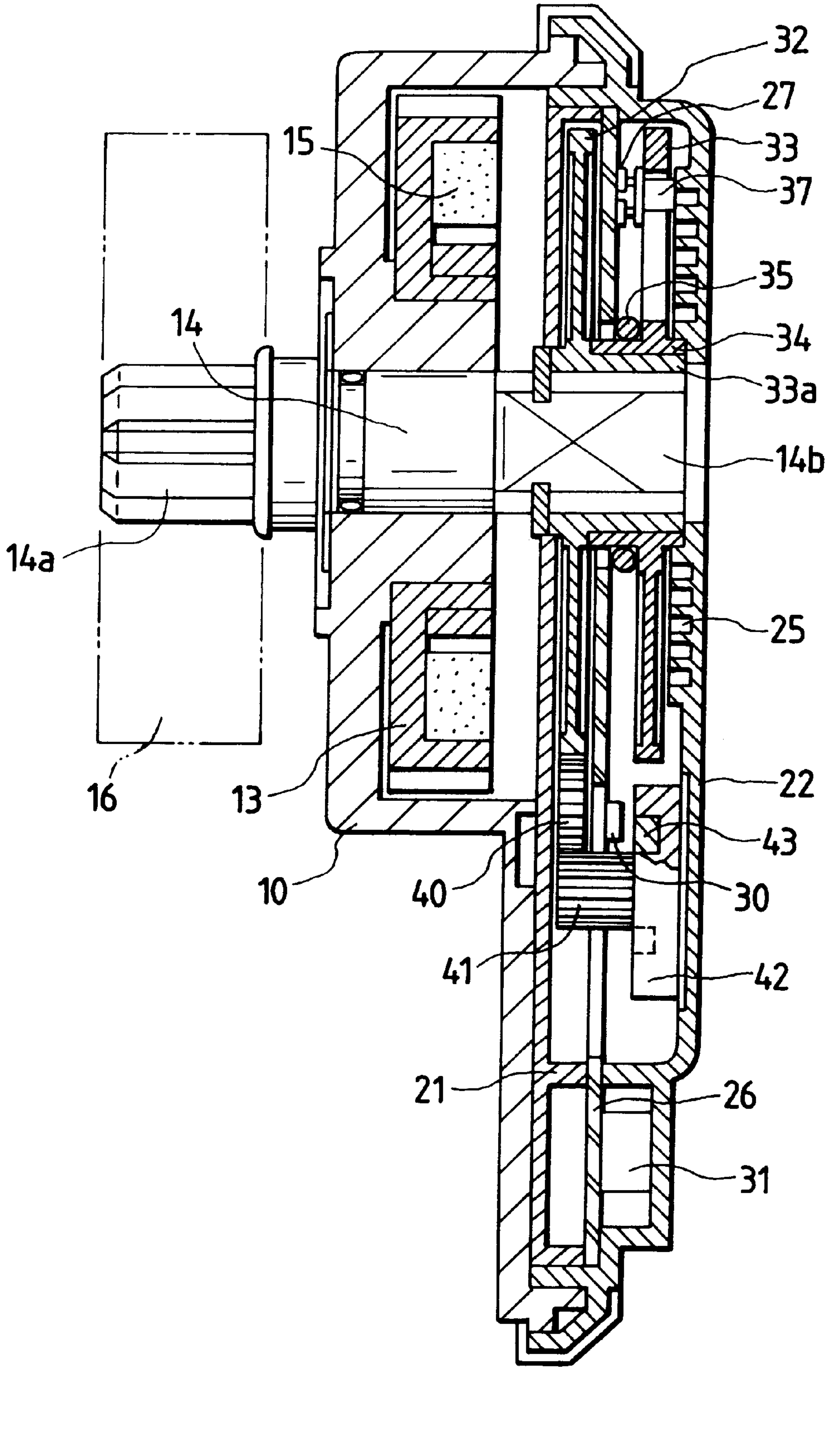
FIG. 4 is a cross sectional view taken along line IV—IV shown in FIG. 3.

FIG. 2 is a partially-broken perspective view showing the structure of the motor 9 of the power-window moving portion 6. FIG. 3 is a planar layout diagram showing the motor 9. FIG. 4 is a cross sectional view taken along line IV—IV shown in FIG. 3. The motor 9 has a basic structure which is the same as that of a conventional motor. A rotational shaft 11 is rotatively supported in a motor case 10 as indicated with a dashed line shown in FIG. 2. A motor actuator (not shown) rotates the motor 9. A worm 12 is integrally joined to the rotational shaft 11. A worm wheel 13 engaged to the worm 12 is rotated at reduced speed by dint of the rotational operation of the rotational shaft 11. Thus, the rotational force of an output shaft 14 which is a rotational shaft of the worm wheel 13 is output. A damper 15 (see FIG. 4) for damping a shock caused in the rotational direction is interposed between the worm wheel 13 and the output shaft 14. The two ends of the output shaft 14 project over the two surfaces of the motor case 10. An end 14*a* of the two ends bears a drive pulley 16 disposed coaxially with the worm wheel 13 and formed into a cylindrical container shape. The wire 4 for opening/closing the window glass 7 is wound around a spiral groove 16*a* formed in the outer surface of the drive pulley 16.

A position sensor 20 integrated with the motor 9 is connected to another end 14*b*of the output shaft 14. The position sensor 20 incorporates a housing 21 formed into a shallow oval container shape and arranged to be secured integrally to the motor case 10 and a housing cover 22 for closing an opening of the housing 21. An end 14*b* of the output shaft of the motor projects over the inner surface of the bottom of the housing 21. Moreover, two fixed shafts 23 and 24 for rotatively supporting a gear to be described later project over the inner surface of the bottom of the housing 21. The thickness of the bottom of the housing cover 22 allows for a spiral guide groove 25 to be formed which has the center at a position opposite to the output shaft 14 and continues outwards from the center.

A printed circuit board 26 also having an oval shape is fixedly accommodated in the housing 21. In a region of the surface of the printed circuit board 26 opposite to the outer portion of the spiral guide groove 25, a pair of circular-arc terminals 27 extending in the lengthwise direction of the spiral guide groove 25 and each having a predetermined length are disposed in parallel with each other. The terminals 27 are constituted by thin copper plates which are embedded in the surface layer of the printed circuit board 26 so as to be flush with the surface of the printed circuit board 26. The printed circuit board 26 has a shaft hole 28 into which the end 14*b* of the output shaft is inserted and a window 29 into which the fixed shafts 23 and 24 are inserted. In particular, a hall element 30 (to be described later) is disposed at a position facing the fixed shaft 24. A connector 31 to which an external connector will be connected, is disposed at an end of a small-diameter portion of the printed circuit board 26, the connector 31 being electrically connected to the terminal 27.

In addition, a first gear 32, having a large diameter, and integrally joined to the end 14*b* of the output shaft is disposed adjacent to the reverse side of the printed circuit board 26. A disc shape rotational plate 33 is disposed adjacent to the right side of the printed circuit board 26 (as viewed in FIG. 2) and opposite to the reverse side wherein the first gear is disposed. A cylindrical sleeve portion 34 provided for the rotational plate 33 is disposed around a boss 32*a* of the first gear 32. A circular spring 35 (see FIG. 4) for imparting a clamping force toward the central portion is joined around the sleeve portion 34. The clamping force of the circular spring 35 causes the inner surface of the sleeve portion 34 to frictionally be engaged to the outer surface of the boss 32*a* of the first gear 32. The frictional engaging force enables the rotational plate 33 to integrally be rotated with the first gear 32 and the output shaft 14.

The rotational plate 33 is provided with a straight guide groove 36 having a radial length longer than the largest diameter of the spiral guide groove 25 and extending in the radial direction. A follower 37 which is capable of moving in the straight guide groove 36 is engaged to the straight guide groove 36. A guide pin 38 projecting in the axial direction is integrally formed with the surface of the follower 37 opposite to the spiral guide groove 25, so that the guide pin projects toward the spiral guide groove 25. The guide pin 38 is inserted into the spiral guide groove 25. A slide member 39 constituted by a metal member in the form of a fork shape and arranged to elastically be slid on the surface of the printed circuit board 26 is supported by the opposite surface of the follower 37. Two slide portions of the slide member 39 are disposed apart from each other for a distance which is the same as the distance between the terminals 27 provided for the printed circuit board 26.

A second gear 40, having a smaller diameter than that of the first gear 32, and arranged to be engaged to the first gear 32, is rotatively joined to the fixed shafts 23 and 24 in the housing 21 adjacent to the first gear 32. Moreover, a third gear 41 having a diameter smaller than the second gear 40, and arranged to be engaged to the second gear 40, is rotatively joined to the same. A disc portion 42 is integrally formed with the third gear 41. An annular multi-pole magnet 43 having south and north poles alternately disposed at the outer periphery thereof is joined to the inner surface of the disc portion 42. A hall element 30 which generates electromotive force when the hall element 30 has detected change in magnetic flux is provided for the printed circuit board 26 at a position opposite to the multi-pole magnet 43. Therefore, when the third gear 41 is rotated one time, the hall element 30 is able to output pulse signals by the number corresponding to the south and north poles of the multi-pole magnet 43. In accordance with the acceleration ratio determined by the gear ratios from the first gear 32 to the third gear 41, a multiplicity of pulse signals are output when the output shaft 14 has been rotated one time. Note that a magnet may be disposed in a portion of the circumference of the third gear 41 to cause one pulse signal to be output from the hall element 30 when the third gear 41 has been rotated one time.

With the position sensor 20, when the rotational shaft 11 is rotated by the motor 9, the worm 12 is integrally rotated. Therefore, the worm wheel 13 is rotated so that the output shaft 14 is rotated integrally with the worm wheel 13. The rotation of the output shaft 14 causes the drive pulley 16 to be rotated. Thus, the wire 4 is driven so that the window glass 7 is opened/closed. When the output shaft 14 has been rotated, the rotational plate 33 and the first gear 32 in the housing 21 are rotated. Therefore, the follower 37 supported in the straight guide groove 36 of the rotational plate 33 is moved in the straight guide groove 36 in the radial direction because the guide pin 38 integrally formed with the follower 37 is moved in the spiral guide groove 25 of the housing cover 22 when the rotational plate 33 has been rotated. The overall length of the spiral guide groove 25 is designed to one-to-one correspond to the overall distance of movement of the opening/closing operation of the window. Thus, the follower 37 is disposed adjacent to the central position when the window is at the fully opened position, while the follower 37 is moved to the outer position when the window is at the fully closed position.

Figure 5:
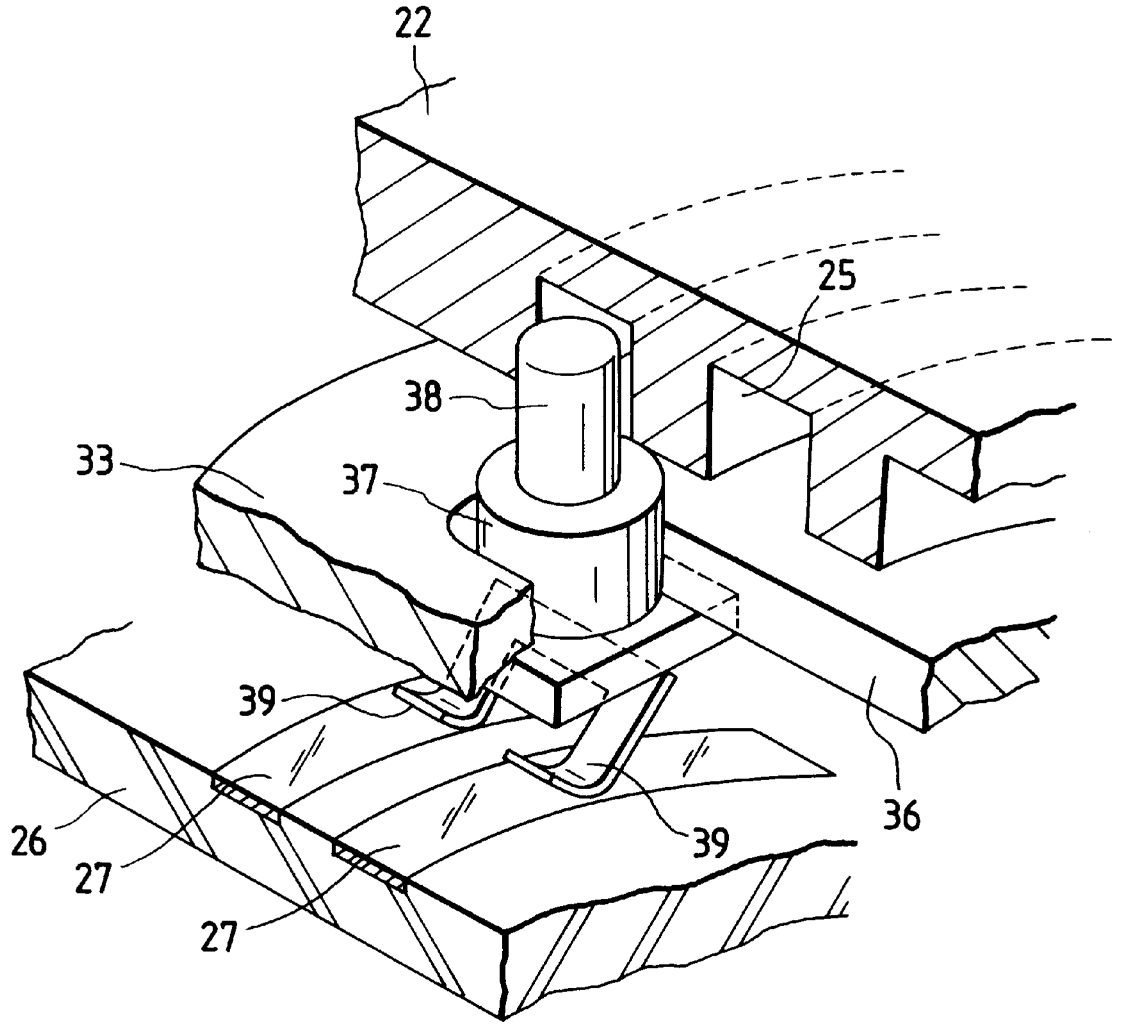
FIG. 5 is an enlarged view showing an essential portion of the operation of the position sensor.

When the motor 9 has been rotated so that the window has been moved to a position adjacent to the fully closed position, the follower 37 is moved to the outermost region of the spiral guide groove 25. When the movement to the outermost region has been performed, the slide member 39 of the follower 37 is brought into contact with the two terminals 27 on the surface of the printed circuit board 26, as shown in FIG. 5 which is an enlarged view. Moreover, the slide member 39 is slid on the surfaces of the terminals 27 so that the two terminals 27 are conducted with each other by the slide member 39. When the terminals 27 are designed to each have a predetermined length, the connector 31 connected to the terminals 27 enables the accurate recognition of a region from a position adjacent to the fully closed position of the window to the fully closed position, in other words, the safety-control suspension region from a position 4 mm from the full closed state of the window to the full closed state.

Figure 6:
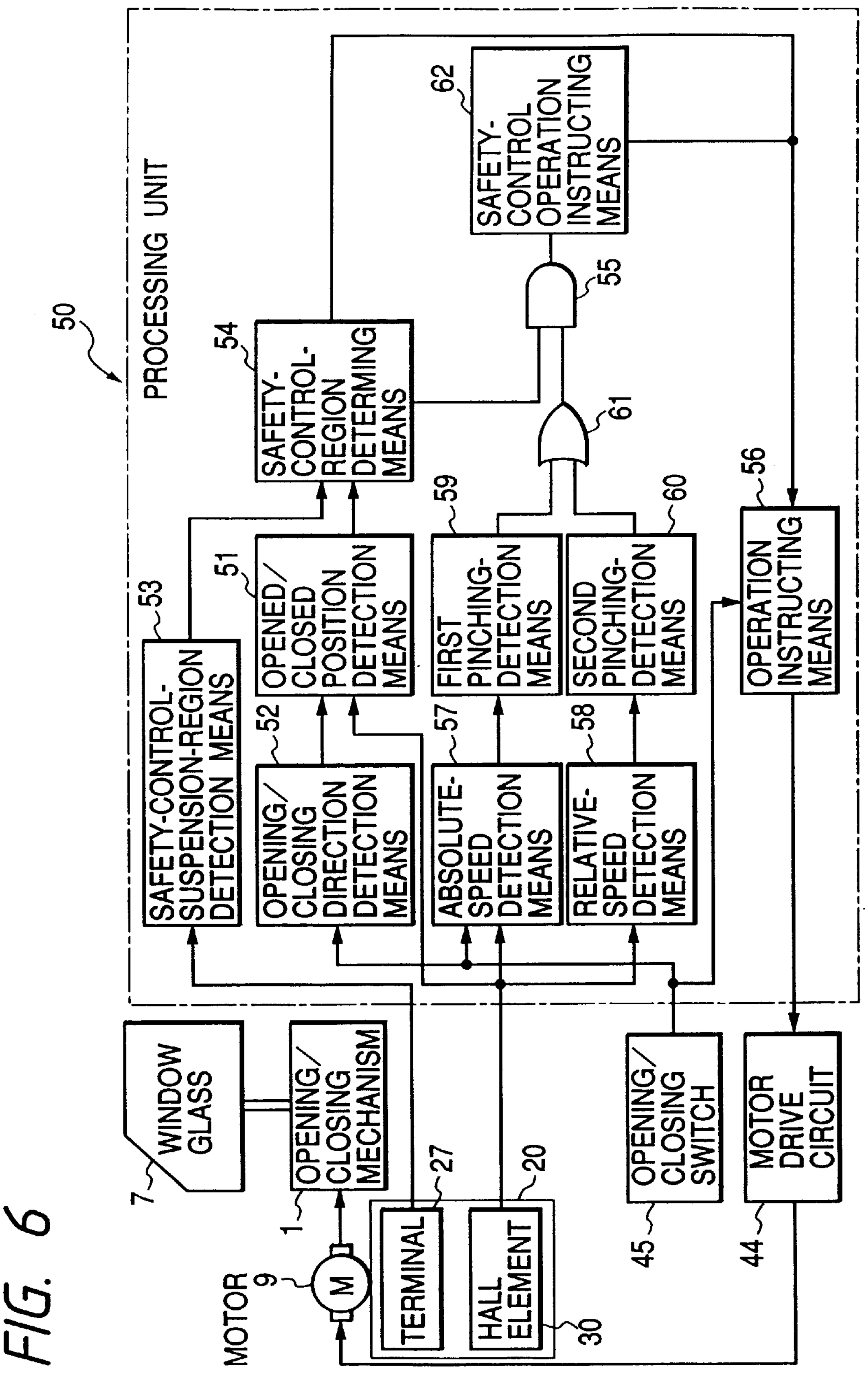
FIG. 6 is a block diagram showing a safety control operation circuit according to the present invention.
Figure 7:
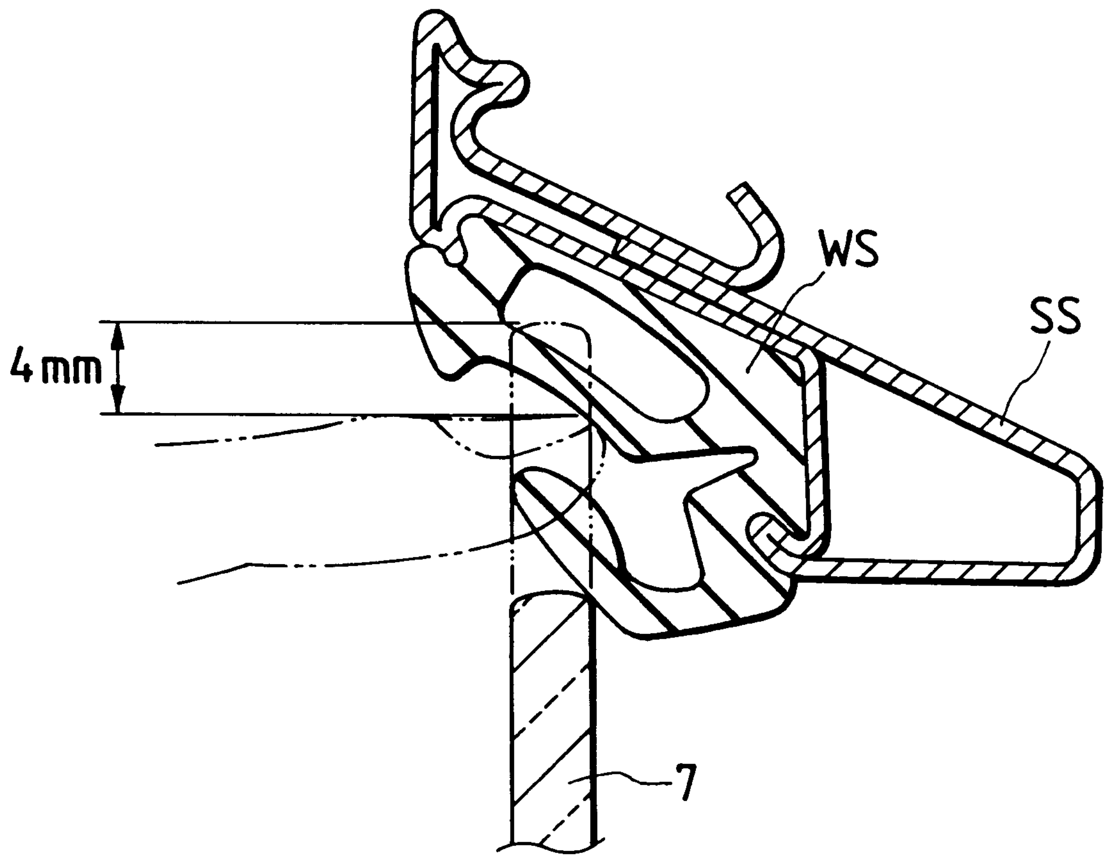
FIG. 7 is a cross sectional view showing run channel region of the window.

FIG. 6 is a circuit block diagram showing the overall structure of the safety apparatus incorporating the position sensor 20. The safety apparatus incorporates the window opening/closing mechanism 1 for opening/closing the window glass 7; the motor 9 serving as a drive source for operating the window opening/closing mechanism 1; the position sensor 20 for detecting the opened/closed position of the window glass 7 realized by the motor 9; a motor rotating circuit 44 for rotating the motor 9; an opening/closing switch 45 which is operated when the window is opened/closed; and a processing unit 50 for controlling the operation for opening/closing the window in accordance with the output from the foregoing units to perform a safety control operation for preventing pinching. Pulse signals output from the hall element 30 of the position sensor 20 are supplied to a window opened/closed position detection means 51. The window opened/closed position detection means 51 is supplied with an output of a window opening/closing direction detection means 52 for detecting an opening/closing direction of the window in response to an open signal or a close signal supplied from the opening/closing switch 45. The window opened/closed position detection means 51 comprises, for example, an up/down counter. A count corresponding to a fully closed state of the window is initialized to "0". In response to the opening direction signal transmitted from the window opening/closing direction detection means 52, the pulse signals are counted in a negative direction. In response to the closing direction signal, the pulse signals are counted in the positive direction. In accordance with the counts, the opened/closed position of the window can be detected.

A safety-control-suspension-region detection mean 53 is supplied with outputs representing the position of the window, transmitted from the terminals 27 of the position sensor 20. Thus, a period of time, in which the outputs representing the position are being supplied, is recognized as the safety-control suspension region so as to output a recognition signal to the safety-control-region determining means 54. An output from the window opened/closed position detection means 51 has been supplied to the safety-control-region determining means 54. In accordance with the output from the window opened/closed position detection means 51 and that from the safety-control-suspension-region detection means 53, the region in which the safety control is performed is determined in the region from the fully opened state of the window to a state immediately before fully closed state of the window, that is, in the region from the full open state of the window to the full close state of the same. A portion of the output from the safety-control-region determining means 54 is supplied to one of input terminals of an AND gate 55. Another portion of the output is supplied to an operation instructing means 56.

The pulse signal transmitted from the hall element 30 of the position sensor 20 is supplied to each of an absolute-speed detection means 57 and a relative-speed detection means 58. The absolute-speed detection means 57 detects a period of time from a moment at which the opening/closing switch 45 has been switched on to a first transition of a next pulse signal or the interval between first transitions of the pulse signals. Thus, the absolute-speed detection means 57 makes a comparison to determine whether or not rotational speed of the motor 9 for opening/closing the window glass 7, that is, the opening/closing speed is higher than a predetermined reference speed. A first pinching-detection means 59 detects a state of pinching of foreign matter if the absolute speed is lower than the reference speed. If the rotational speed of the motor 9 is 20 ms/revolution or lower, the state of pinching is detected. The relative-speed detection means 58 detects time intervals of pulse signals which have sequentially been output to detect change in the speed of the opening/closing operation of the motor 9, that is, the relative speed in accordance with the ratio of the time intervals. A second pinching-detection means 60 detects pinching of foreign matter if the relative speed is lower than a predetermined value. If the relative speed is reduced by 10% or more, the state of pinching is detected.

Outputs from the first and second pinching detection means 59 and 60 are supplied to input terminals of an OR gate 61. An output from the OR gate 61 is supplied to the other input terminal of the AND gate 55. An output from the AND gate 55 is supplied to a safety-control-operation instructing means 62. When the pinching detection signal has been supplied to the safety-control-operation instructing means 62, the safety-control-operation instructing means 62 controls the operation instructing means 56 to perform the safety control operation. In this embodiment, control is performed such that the window glass 7 is moved in an opening direction for a distance of 12 cm from the opened/closed position.

Therefore, the safety apparatus according to the present invention is able to recognize the opening/closing state and the opened/closed position of the window in response to the pulse signals supplied from the hall element 30 included in the position sensor 20. In accordance with the outputs from the terminals 27 of the position sensor 20, whether or not the window is positioned in the safety-control suspension region can be recognized. When the window is positioned in the safety-control region, the absolute speed and the relative speed of the opening/closing operation of the window are calculated in response to the pulse signal transmitted from the hall element 30. The calculated speeds are subjected to a comparison with the reference value so that pinching by the window is detected. When pinching has been detected, the motor rotating circuit 44 interrupts the rotation of the motor and the opening operation is performed in a predetermined quantity. Thus, safety can be assured.

When the position sensor 20 according to this embodiment is employed, the opened/closed position of the window, in particular, a position adjacent to the fully closed position of the window can mechanically and electrically be detected. Thus, the safety-control suspension region for the window can be recognized and errors in detecting pinching can be prevented. Since the position sensor 20 is integrally formed with the motor 9, the space for disposing the position sensor adjacent to the window is not required. As a result, the structure in the vicinity of the window of the automobile can be simplified and space can be saved. Moreover, an error of the mounting position of the position sensor 20 does not cause an error in detecting the opened/closed position of the window. Since the hall element 30 for detecting the state of rotation of the motor 9 is included in the position sensor 20, the number of elements required to constitute the safety control apparatus can be reduced. In addition, an advantage can be realized in that the number of steps for assembling the power window apparatus is reduced.

If fatigue of the weather strip or looseness of the wire 4 in the window opening/closing mechanism 1 results in the fully closed position of the window being moved in the closing direction, the relative position between the position of the window and the position sensor 20 is deviated. As a result, there is apprehension that an error occurs when the fully closed position is detected in accordance with the output voltage from the position sensor 20. However, the position sensor 20 has the structure that the rotational plate 33 is frictionally engaged to the boss **32*a* of the first gear 32 joined to the output shaft 14*b*. Therefore, even if the follower 37 has arrived at an outer end in the radial direction, the window is not in the fully closed state. Even if the output shaft 14*b* of the motor 9 is rotated, the first gear 32 integrally provided for the output shaft 14*b* is idly rotated with respect to the rotational plate 33**.

When the rotation of the motor has been interrupted when the window is at the fully closed position, a state in which also the follower 37 is positioned at the end position is maintained. As a result, an error between the two units can be corrected. The foregoing operation is similarly performed when the follower 37 has arrived at the end position adjacent to the central portion prior to the rotation of the rotational plate 33 in the opposite direction, that is, movement of the window to the fully closed position. Thus, an error between the actual opened/closed position of the window and the position of the follower 37 moved along the spiral guide groove 25 can always be corrected. Since the terminals 27 according to this embodiment are flush with the surface of the printed circuit board 26, any stress is not imparted to the contact member when the contact member 39 is brought into contact with the terminals 27. Therefore, the contact member can be brought into contact with the terminals 27 in a stable state. As a result, the safety-control suspension region can accurately be recognized.

The terminals 27 according to this embodiment and constituted by conductive films may be constituted by a resistance film to detect the position of the follower as change in the resistance value. Thus, the position of the window in the safety-control suspension region can be detected even more precisely. Although the foregoing embodiment has been described about the structure in which the hall element 30 is integrally included in the position sensor 20, a structure in which the hall element is not included may, of course, be employed. For example, a power window apparatus adapted to a method by which pinching in the window is detected in accordance with an electric current in the motor is structured such that the hall element is not included. In the foregoing case, the printed circuit board and the first to third gears are not required. In place of the hall element, a rotational brush structure may be employed to cause a pulse signal to be output from the rotational brush structure when the third gear has been rotated.

The rotational plate according to the present invention has the straight guide groove to support the follower. Therefore, the rotational plate may be formed into a rotational arm extending straight in the radial direction. When the hall element is omitted as described above, the position sensor may have a structure having a spiral guide groove formed in the inner surface of the housing and the terminals disposed on the inner surface of the housing cover to omit the printed circuit board.

As described above, according to the present invention, the position sensor is provided which detects a region adjacent to the fully closed position of the window in accordance with an amount of rotation of the rotational output shaft of the motor. As the position sensor, the follower supported by the rotational plate which is rotated by the output shaft of the motor is moved in the straight guide groove of the rotational plate in the radial direction while it is being guided by the spiral guide groove. When the follower has been moved to the outer position of the spiral guide groove and brought into contact with the terminals, an output signal can be obtained with which the safety-control suspension region can be detected. Therefore, an error in detecting pinching occurring during the safety control which is performed by the power window apparatus can be prevented. Thus, a reliable safety control operation can be performed. Since the present invention has the structure that the rotational plate and the follower are rotated along the spiral guide groove, the load exerted on the motor can be reduced as compared with the structure by which the spiral guide groove portion is rotated. Therefore, detection using a higher speed rotational operation can be performed.

As compared with a structure in which the number of revolutions of the output shaft of the motor is reduced and the position detection is performed by a potentiometer structure using the reduced number of revolutions, an accuracy of the sensor to detect the position with respect to change in the rotational angle can be improved. As compared with a structure in which the position is detected one-to-one corresponding to an amount of movement of the window and a plurality of numbers of revolutions of the output shaft of the motor are detected as repeated change in the resistance value in the potentiosensor followed by processing the detected output in an electric circuit, the structure of the circuit can significantly be simplified. Moreover, occurrence of an error in the processes in the circuit can be prevented and, therefore, detection can accurately be performed.

What is claimed is:

1. A power window apparatus having a safety unit, comprising:

a position sensor for detecting an opened/closed position of a window which is opened/closed by a motor to perform a pinch preventive safety control operation in accordance with the detected opened/closed position, wherein said position sensor incorporates a spiral guide fixedly disposed in a housing integrally supported by said motor;

a rotational plate arranged to be rotated along a guide surface of said spiral guide by an output shaft of said motor disposed at the center of said spiral guide and provided with a straight guide groove formed in a radial direction;

a terminal disposed at a predetermined position in said housing facing a predetermined region of said spiral guide; and a follower supported in said straight guide groove of said rotational plate arranged to be moved along said straight guide groove while said follower is being guided by said spiral guide and brought into contact with said terminal at a predetermined movement position to enable an electric signal to be output from said terminal.

2. A power window apparatus having a safety unit according to claim 1, wherein said terminal is constituted by a pair of conductive films which are electrically conducted by said follower when said follower has been moved to a position corresponding to a predetermined distance from a fully closed position of said window, along a direction in which said window is opened.

3. A power window apparatus having a safety unit according to claim 2, wherein said position sensor is provided with a gear arranged to be rotated by said output shaft of said motor, a magnet disposed in at least a portion of the circumference of said gear and a hall element disposed adjacent to said gear and arranged to detect a state of rotation of said magnet caused by the rotation of said gear, and wherein at least the opened/closed position of said window is detected in response to a pulse signal output from said hall element.

4. A power window apparatus having a safety unit according to claim 2, wherein said position sensor is provided with a gear arranged to be rotated by said output shaft of said motor, a magnet disposed in at least a portion of the circumference of said gear and a hall element disposed adjacent to said gear and arranged to detect a state of rotation of said magnet caused by the rotation of said gear, and pinching in said window is detected in response to a pulse signal output from said hall element.

5. A power window apparatus having a safety unit according to claim 1, wherein a guide pin and a slide member are formed with said follower, said guide pin extending from one surface of said follower so as to be inserted into said spiral guide, and said slide member extending from another surface of said follower so as to be elastically slid on said terminal.

* * * * *